(12) United States Patent
Walacavage et al.

(10) Patent No.: US 7,433,801 B2
(45) Date of Patent: Oct. 7, 2008

(54) IDENTIFYING AND VISUALIZING FAULTS IN PLC-BASED MANUFACTURING SYSTEMS

(75) Inventors: Joe Walacavage, Ypsilanti, MI (US); Eric Newman, Brighton, MI (US); James McAlpine, Northville, MI (US)

(73) Assignee: Ford Motor Company, Dearborn, MI (US)

(*) Notice: Subject to any disclaimer, the term of this patent is extended or adjusted under 35 U.S.C. 154(b) by 233 days.

(21) Appl. No.: 11/295,027

(22) Filed: Dec. 5, 2005

(65) Prior Publication Data

US 2007/0143076 A1    Jun. 21, 2007

(51) Int. Cl.
G06F 15/00    (2006.01)
(52) U.S. Cl. .................................... 702/185
(58) Field of Classification Search .................. 702/185
See application file for complete search history.

(56) References Cited

U.S. PATENT DOCUMENTS 4,985,857 A * 1/1991 Bajpai et al. ................. 702/184
5,287,435 A * 2/1994 Cohen et al. ................. 345/418
5,414,632 A * 5/1995 Mochizuki et al. .......... 700/174
5,754,451 A * 5/1998 Williams ..................... 702/185

* cited by examiner

Primary Examiner—Bryan Bui
Assistant Examiner—Aditya S Bhat
(74) Attorney, Agent, or Firm—Tung & Associates (57) ABSTRACT

Textual fault messages in PLC-based manufacturing systems are supplemented by automatically displayed sets of information that allow an operator to quickly identify, recognize and visualize components responsible for producing faults. Visual display of stored computer generated images showing system components and tooling allow the operator to visually pinpoint the exact component responsible for the fault, and its location within the manufacturing system. Stored information associated with the component producing the fault, such as installation date, vendor sources, replacement part inventory, programming logic and editing software, is also automatically recalled and displayed along with the fault message to aid fault diagnosis and correction.

19 Claims, 6 Drawing Sheets

IDENTIFYING AND VISUALIZING FAULTS IN PLC-BASED MANUFACTURING SYSTEMS

FIELD OF THE INVENTION

This invention generally relates to the diagnosis and correction of faults occurring in PLC-based manufacturing systems, and deals more particularly with an improved system for rapidly identifying, recognizing and visualizing a particular component or tool responsible for producing a fault.

BACKGROUND OF THE INVENTION

Complex manufacturing operations often employ multiple operating stations or cells in which sequential machining, assembly or other operations are performed on a workpiece. These sequential operations are often controlled by a PLC (Programmable Logic Controller) in order to automate work station operations and material flow. PLCs are industrial computer control systems that continuously monitor the state of input devices and make decisions based on custom software to control the state of output devices. Broadly, PLCs comprise a central processing unit (CPU), a memory system, input modules and output modules, a programming device and one or more operating modules that allow an operator to process information to be displayed and new control parameters to be entered.

PLCs typically perform four sets of operations: scanning the state of input devices, executing user created program logic, controlling output devices connected to the PLC and performing miscellaneous housekeeping activities which may include communications with programming terminals, internal diagnostics, etc. Several languages are employed to program PLC'S, although ladder logic is most commonly used. More recent PLC applications may utilize simulation software programs which allow simulation of a variety of operating conditions useful in designing and testing the PLC system. As a result, in part, of the development of simulation programs, a number of "virtual" relationships are established between tooling, control devices, PLC logic, PLC I/O fault bits, etc.

Complex manufacturing systems controlled by PLC's sometimes experience failures which are registered as a machine fault condition, or a "fault". A fault exists where, as a result of the PLC executing the PLC logic used to control the operating cycle of tooling, the PLC has encountered a set of conditions that indicate a non-manual intervened interruption has occurred, causing the system to stop production. Such faults may be due to the failure of a physical device, such as a sensor within the system, or may be caused by an error in software logic or other non-physical phenomena.

In the past, a machine fault was communicated to an operator by means of a fault code or textual machine fault message being displayed on a graphical display, typically a touch screen display in view of an operator. These fault codes and textual messages were normally brief, and even cryptic, providing little information concerning the exact nature and location of the problem giving rise to the fault. Because of the highly abbreviated nature of these fault messages, an experienced operator was required to interpret the intent of the message. Typically, the fault message provided only a PLC I/O memory bit address corresponding to an element that was bad, without any reference to the physical location of the fault within the manufacturing system, or identification of the particular control device type.

A number of virtual relationships have been established between various parts of the PLC based system but these relationships have not been advantageously used in diagnosing faults. For example, existing PLC control logic simulation includes the use of: PLC control logic that is used on the manufacturing plant floor; virtual tooling models that interact with the execution of the PLC logic during a simulation; virtual control devices such as sensors and actuators; 3 D visualization data of the tooling, facilities and control devices. When setting up the PLC control logic simulation "virtual wire" connections are made between the pertinent PLC I/O locations and the virtual control devices, exactly replicating the relationship between the physical tooling and PLC hardware and logic. PLC control logic simulation (virtual PLC) is performed where the PLC logic is tested against the virtual tooling and control device models. The end result is PLC logic that is verified to process design intent. In the past, the verified PLC logic files are the only information sent down stream in the process of building tools for use in tool tryout and production from the control logic simulation process.

The inability to quickly identify, recognize and locate devices within the manufacturing system responsible for faults increases system downtime and impairs timing of launch ramp up of new PLC based manufacturing systems.

Accordingly, there is a need in the art for an improved system for rapidly identifying and visualizing faults in PLC-based manufacturing Systems which overcomes the problems discussed above. The present invention is intended to satisfy this need.

SUMMARY OF THE INVENTION

According to one aspect of the invention, a method is provided for identifying sources of faults in the operations of a machine system controlled by a PLC. The method comprises the steps of storing visual representations of a plurality of devices within the machine system, storing a plurality of fault messages each describing a possible fault produced by at least one of the devices; associating the stored visual representations with the stored fault messages such that each of the fault messages is associated with a visual representation of at least one of the devices; displaying at least one of the fault messages when a fault is produced by a device; and, displaying a visual representation of a device producing the displayed fault.

The stored visual representations may comprise a three dimensional CAD view depicting each of the devices and their location within the machine system. The method may also include storing a plurality of sets of data describing characteristics of the devices, associating these data sets with the fault messages such that each of the fault messages is associated with a set of data describing characteristics of the devices, and retrieving and displaying the data associated with the device producing the fault message. The characteristics may comprise, for example, serial numbers, vendor information or spare part inventory information. The method may further include storing software editing programs and programming logic, and retrieving portions of the editing program and programming logic necessary to diagnose a fault.

According to another aspect of the invention, a method is provided for identifying, visualizing and locating faults in the operation of a computer controlled manufacturing system, comprising the steps of: storing a set of fault codes, each of which represents a possible fault in a component forming a part of the manufacturing system; displaying a fault code corresponding to a component responsible for producing a possible fault; and generating, in response to the fault code, a visual image showing the component responsible for the fault and the location of the component within the manufacturing system. The components are highlighted within the visual images to allow rapid identification of a component responsible for the fault.

According to still another aspect of the invention, a system is provided for locating and visualizing faults in the operation of a computer controlled manufacturing operation having multiple operating stations. The system includes a display for displaying information relating to the operation of the manufacturing operation, including display of fault information. A memory system is provided for storing a set of fault codes and related fault messages, as well as a set of images visually representing the operating stations and components within the stations. A programmed controller is provided for sensing a fault in the manufacturing operation, for causing a fault code and fault message stored in the memory system to be displayed and for causing one of the images stored in the memory system to be displayed that visually shows the particular operating station and component within the station responsible for producing the fault.

An important advantage of the present invention lies in its ability to permit a relatively inexperienced operator to quickly identify, recognize and locate a device, tooling or other component responsible for producing a machine fault. This system allows an operator to determine the "root cause" of a machine fault without recourse to manuals, hard copy drawings or other reference materials outside of the PLC. The present invention takes advantage of existing virtual relationships between components of the manufacturing system as well as simulation programs.

These non-limiting features, as well as other advantages of the present invention may be better understood by considering the following details of a description of a preferred embodiment of the present invention. In the course of this description, reference will frequently be made to the attached drawings.

DETAILED DESCRIPTION OF THE PREFERRED EMBODIMENT

Figure 1:
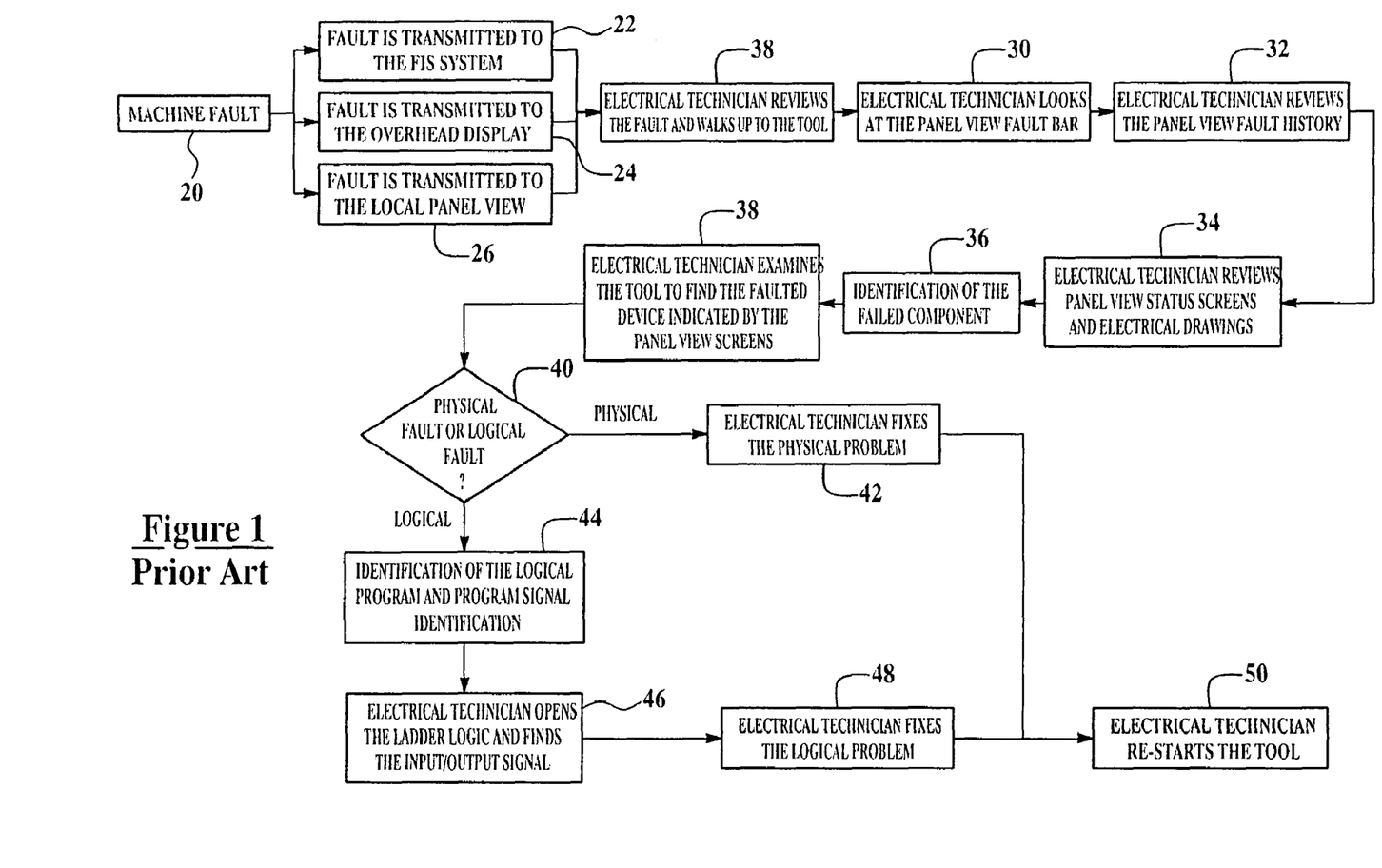
FIG. 1 is a flow diagram showing the process for resolving a machine fault in accordance with the prior art.

The present invention may be better understood by first appreciating the prior art process used by plant floor personnel for determining and resolving a machine fault, and in this connection, reference is made to FIG. 1. The troubleshooting process is initiated as a result of a machine fault at 20. A machine fault occurs when the PLC encounters a set of conditions that indicate a non-manual intervened interruption has occurred, causing the machine or production line to stop production. The PLC detects this fault as a result of reading input signals received back from control devices on tooling located within various stations or cells in the production line. The fault may be the result of a malfunction in a physical device, or a malfunction in control logic.

Upon its detection at 20, the fault is transmitted to the fault information system at 22 as well as to an overhead display at 24, and to a local computer touch display screen, sometimes referred to as an operator interface display, at 26. Next, at 28, an operator reviews the fault on the operator interface display and approaches the tool. At 30, the operator reads a fault bar on the operator interface display which normally consists of a simple fault code or a brief fault message. Using the operator interface display, the operator typically will then review the history of the fault at 32 to determine whether similar faults have occurred in the past. At 34, the operator must review a series of status screens on the panel view as well as electrical drawings in order to attempt to trace the source of the fault. At 36, the operator eventually identifies the station or tooling item that is the source of the fault, and then at 38 examines the tool in more detail to locate the specific device responsible for the fault. At 40, the operator determines whether the fault is a physical fault or a logical fault.

If the fault is physical, the operator fixes the physical problem at 42 and then restarts the tool at 50. However, if the fault is a logical fault, then at 44 the operator must identify the logic program and signals in which the fault is located. At 46, the operator opens the ladder logic and traces the input/output signal related to the fault. The operator then fixes the logical problem at 48 and restarts the tool at 50. From the forgoing, it may be appreciated that the prior art troubleshooting process requires a substantial amount of knowledge concerning the construction details of the production line as well as the program logic used by the PLC in order to locate and resolve the fault. In many cases, even a skilled operator may need to resort to various hard copy diagrams and drawings in order to trace the exact location and the specific device responsible for the fault.

Figure 2:
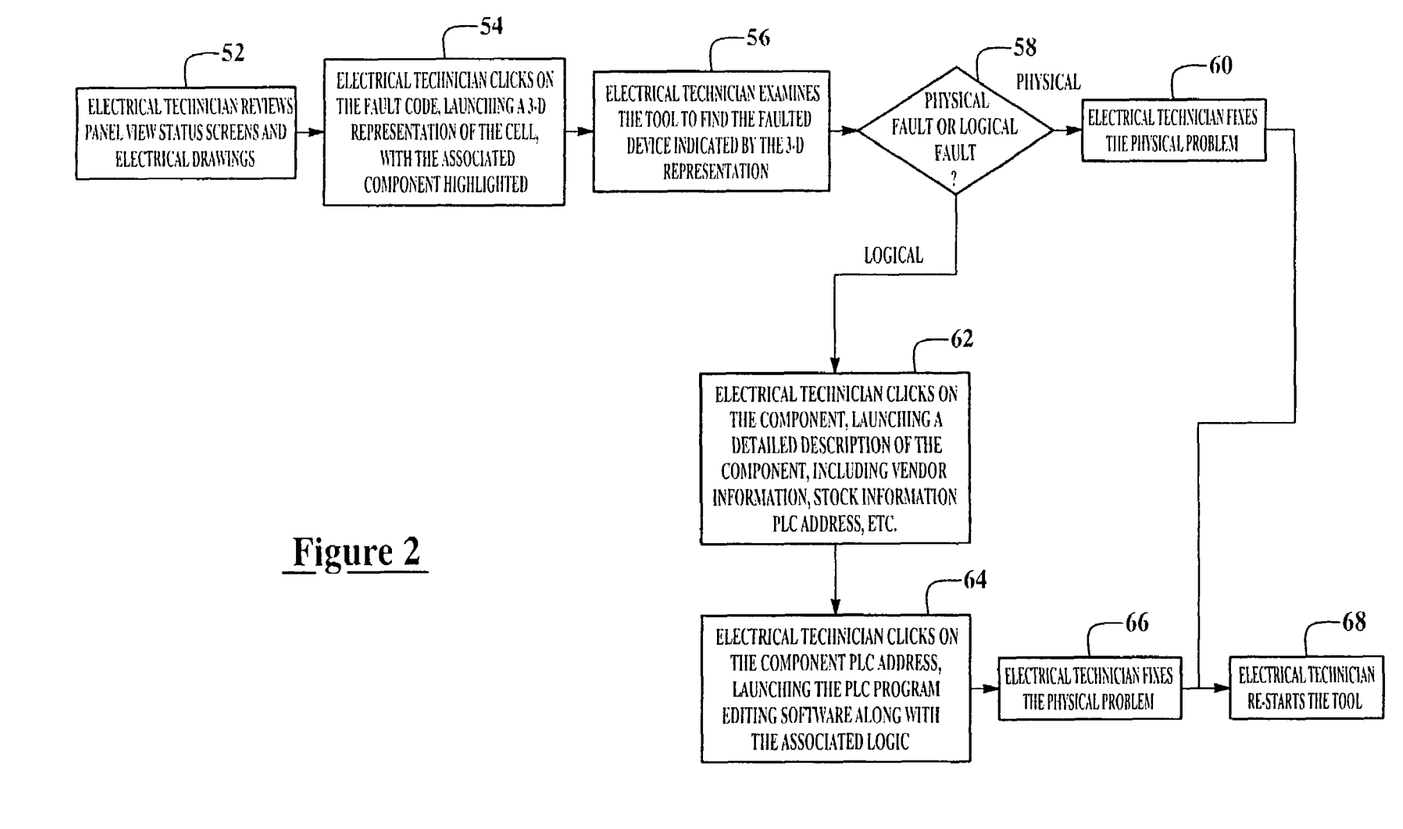
FIG. 2 is a flow diagram showing steps for identifying, recognizing and locating machine faults, in accordance with the present invention.

Referring now to FIG. 2, the present invention represents a substantial improvement over the prior art method described above, by permitting rapid identification, recognition and location of both device and logical faults in a PLC based manufacturing system. In response to a fault condition, the operator first reviews the operator interface display status screens and electrical drawings at 52, which reveal the fault code and a brief fault message. Then, at step 54, the operator launches a 3 D representation of the station where the fault originates, in which the component or device associated with the fault is highlighted, preferably in a contrasting color. The operator launches this 3 D representation simply by using the operator interface display and clicking on the fault code.

Next at step 56, the operator examines the particular tool to locate the faulted device indicated in the 3 D representation. This allows the operator to determine whether the fault is physical or logical as indicated at step 58. If the fault is physical, the operator corrects the physical problem at 60 and restarts the tool at 68. However, if the operator determines the fault to be logical, they click on the component on the touch screen, resulting in a detailed description of the component being launched that includes vendor information, stock information, PLC address and other characteristics that define and describe the component. Next at step 64, the operator clicks on (using the touch screen) the component PLC address, thereby launching the PLC program editing software along with the associated logic. This enables the operator to fix the logical problem at 66, following which they may restart the tool at 68.

Figure 3:
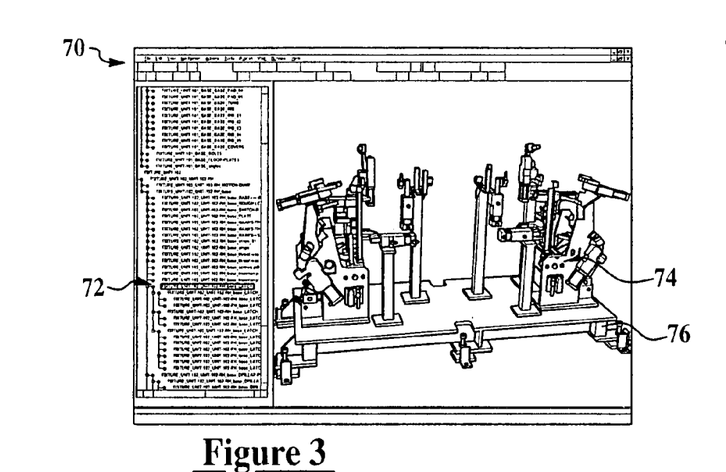
FIGS. 3, 4 and 5 are computer screens showing information displayed to an operator using the system of the present invention.

When the operator clicks on the fault code at step 54, a screen appears as shown in FIG. 3. As shown in FIG. 3, a 3 D CAD drawing view is displayed, showing the tooling in which the fault resides. A list of the various component parts of the tooling 76 are provided along the left hand side of the screen 70, and it can be seen that the highlighted line 72 identifies the source of the fault as being fixture unit 102. As shown in the CAD view, the subassembly 74 in which the fault is located is highlighted in a contrasting color.

Figure 4:
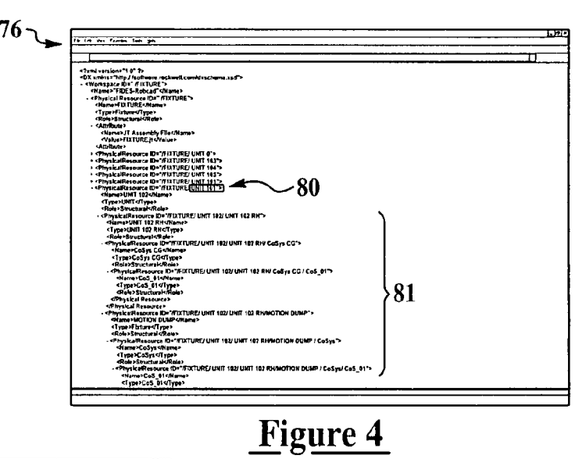
Figure 5:
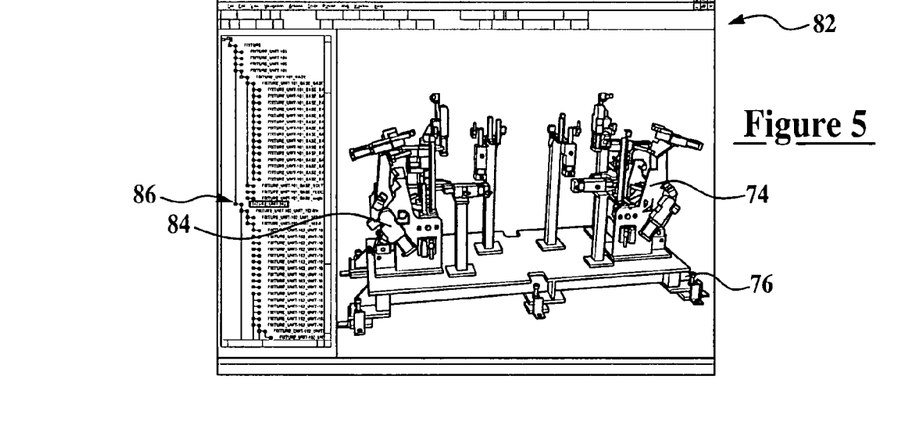

The operator may obtain additional information concerning the fault component by clicking on line 72 in FIG. 3, which results in display of the screen 78 shown in FIG. 4 comprising a series of lines of text including line 80 which identifies fixture unit 102 and a series of sub-lines 81 which describe the component parts of fixture unit 102. The operator may click on an additional screen 82 shown in FIG. 5 which includes a series of textual lines on the left hand side, including a highlighted line 86 which identifies the specific source of the fault as being a right hand (RH) base latch. This base latch 84 is shown in highlight in the 3 D CAD view in screen 82. Thus, it can be appreciated that simply by using the touch panel computer screen (operator interface display), the operator can quickly identify the exact cause and location of the fault simply by navigating through a pre-programmed menu that provides a description of the device responsible for the fault well as a visualization of the general and specific locations where the device is resident.

Figure 6:
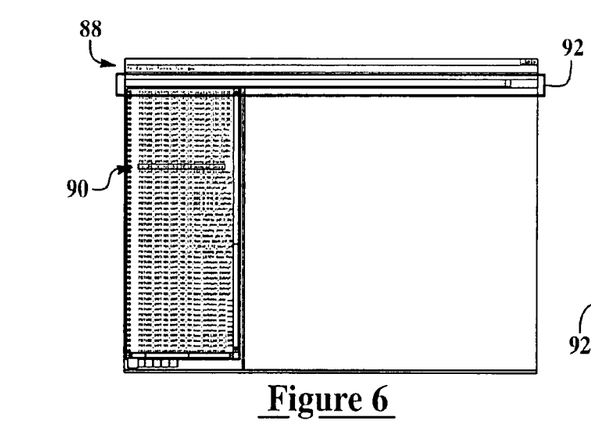
FIGS. 6, 7 and 8 depict a series of computer screens providing the operator with visualization of devices responsible for a fault.
Figure 7:
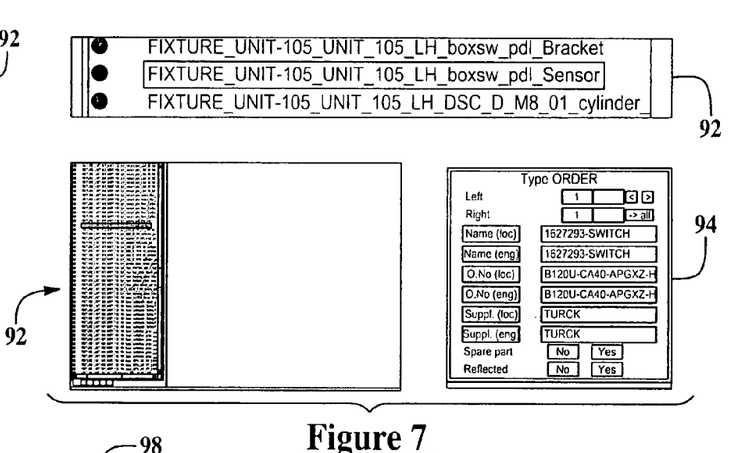
Figure 8:
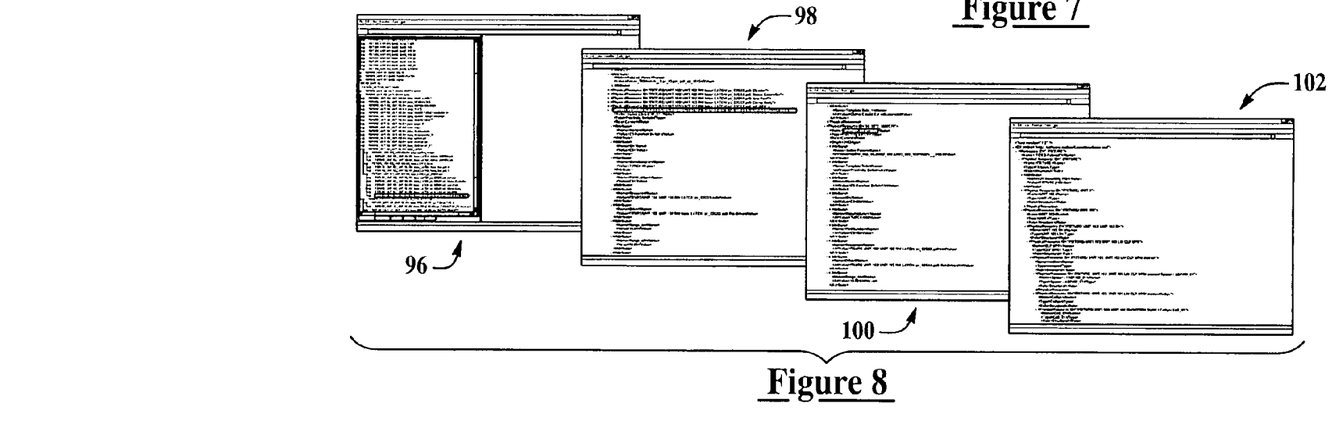

In a manner similar to that described in connection with locating physical faults, logical faults can be located and resolved, and in this connection reference is now made to FIGS. 6-8. Screen 88 shows a series of text fault messages displayed in combination with a 3 D CAD view of the manufacturing line. Text line 90 identifies fixture unit 105 and left hand box switch/sensor. The particular part of the manufacturing line shown in the CAD view in FIG. 6 is described in text line 92 as station 20. In order to determine more information about the fault, the operator clicks on text line 90, resulting in the screen 92 being displayed as shown in FIG. 7. As shown in screen 92, the sensor is highlighted and described in text line 92. In addition, further information is displayed concerning the sensor, as shown in screen portion 94, consisting, for example of the vendor's name, the existence of spare parts and the part number of the sensor. Next, by clicking on the component PLC address, the operator is able to launch the PLC program editing software along with associated logic, resulting in a series of screens 96-102 being displayed as shown in FIG. 8.

Figure 9:
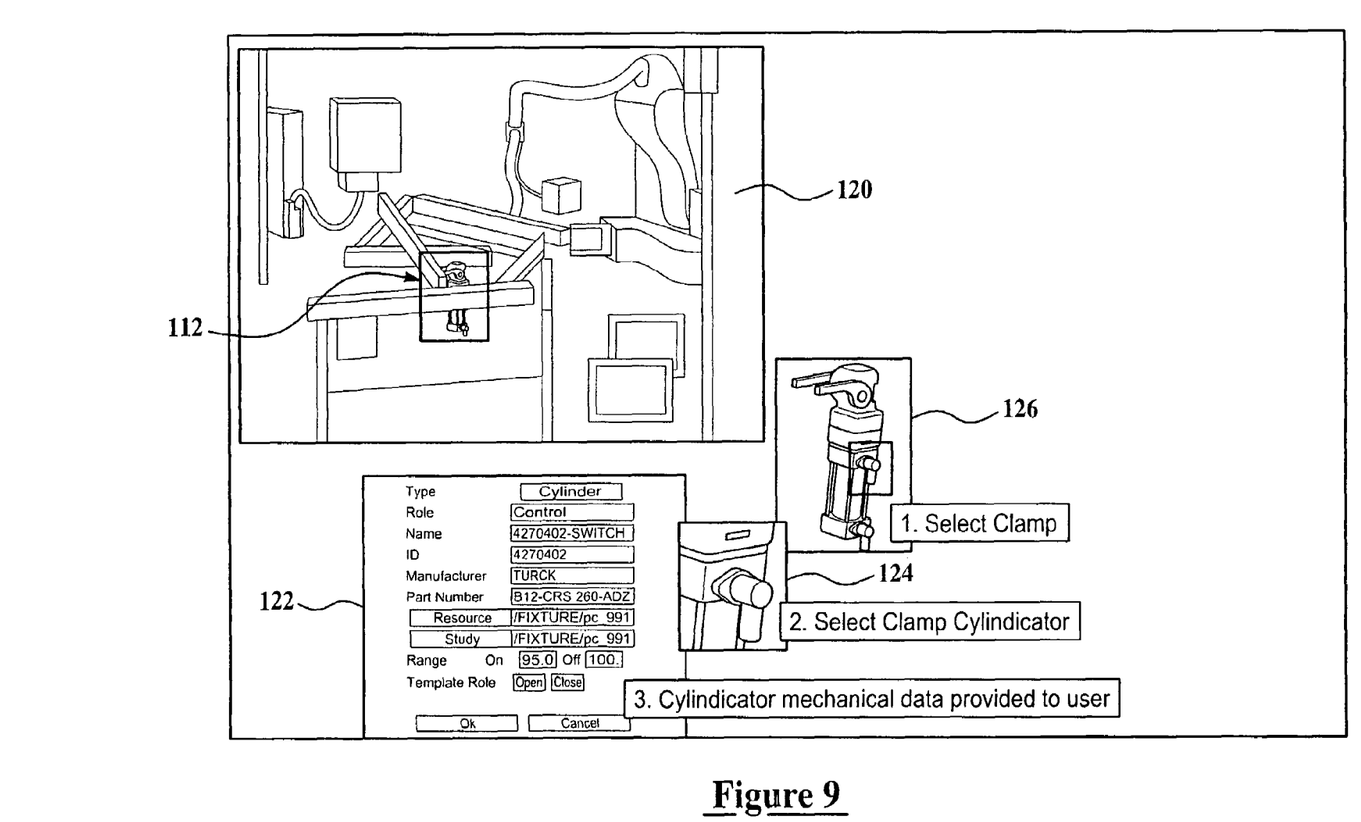
FIG. 9 depicts a computer screen showing how an operator may select various views to recognize and visualize the root cause of a fault.

The visualization and related information described above can be displayed to the operator in separate windows on a single screen, if desired, allowing the operator to visually associate multiple pieces of related information identifying the fault. For example, as shown in FIG. 9, a stored or real time image 120 of the manufacturing line on the plant floor includes a computer generated box 112 showing the area of the line or station where the fault-producing device is located. A subassembly containing the fault-producing device is displayed as a CAD generated view in a second window 126. In this example, the subassembly comprises a clamp, and the faulting device is a sensor referred to as a "cylindicator" which senses the position of a cylinder forming part of the clamp. A third window 124 is displayed in the screen which shows further details of the cylindicator, in the form of a CAD generated perspective view. A fourth window 122 provides information about the cylindicator, such as its name, manufacturer, part number, etc.

Figure 10:
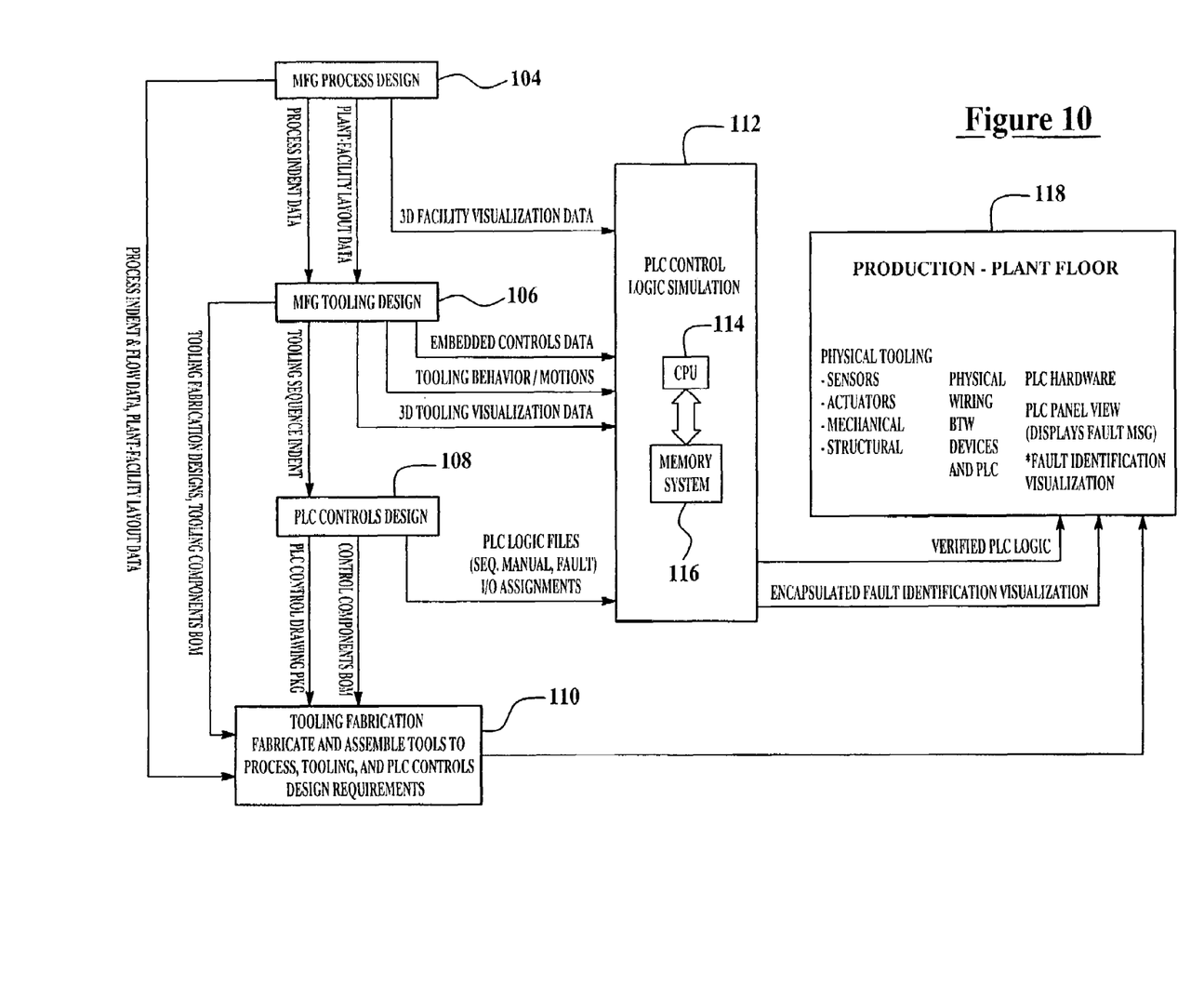
FIG. 10 is an overall block diagram showing how the method of the present invention integrates design, fabrication and operating phases of a PLC based manufacturing system.

Reference is now made to FIG. 10 which depicts the control logic simulation environment as well as the PLC hardware and software used on the plant floor, at different stages during the workflow. The design of the manufacturing process at 104 results in process intent data and plant facility layout data that is then used in the manufacturing tooling design 106. The manufacturing process design also results in 3 D facility visualization data being generated and stored in the PLC 112, and particularly within a memory system 116 controlled by CPU 114. The visualization data stored in the memory system 116 may comprise a digital data file representing a CAD drawing image or a digitized photographic image. The manufacturing process design also results in process intent and flow data as well as plant facility layout data being used in the process for fabricating tooling 110.

The manufacturing process having been designed, the manufacturing tooling is then designed as shown at block 106. The tooling design results in a series of information being stored in the PLC, including embedded controls data, tooling behavior and motions, and 3 D tooling visualization data. The tooling design also results in information concerning tooling sequence intent being used in the PLC control design 108. Finally, the tooling design process results in the actual fabrication designs, and the bill of materials used in the tooling fabrication 110.

When the PLC controls are designed at 108, PLC logic files are then stored in the PLC 112 and information concerning the PLC control design is used in the tooling fabrication, including a PLC control drawing package and a bill of materials for the control components.

The production plant floor is represented at 118 where physical tooling wiring and PLC hardware is located. The physical tooling may typically include sensors, actuators, mechanical devices and structural components. The PLC control logic simulation 112 is used to verify the PLC logic installed in the PLC hardware as well as to verify and coordinate the encapsulated fault identification visualization information resident in the PLC.

The fault identification visualization technology described above is compatible with residing and operating in the background in both the control logic simulation environment and also within the PLC hardware and software environment used on the plant floor at different stages during the workflow shown in FIG. 9. While resident in the PLC logic control simulation environment, the fault identification and visualization system of the present invention dynamically establishes encapsulated linkages between the control logic I/O information, PLC control logic files (typically ladder logic), control logic machine fault messages, control devices (sensors, actuators, etc.), PLC control logic simulation visualization data (3 D representation of tooling and associated tooling behaviors) for intended reuse during plant operating in production as a line side fault identification visualization aid.

Downstream in the workflow, the fault identification visualization system of the present invention and encapsulated information resides in the PLC hardware/software floor environment such that it is capable of augmenting the typical textual fault messages, with emphasis on the visual identification and navigation aids to quickly determine the source location of the fault signal.

It is to be understood that the system, which has been described are merely illustrative of one application of the principles of the invention. Numerous modifications may be made to the device of the method as described without departing from the true spirit and scope of the invention.

What is claimed is:

1. A method for identifying, visualizing and locating faults in the operation of a computer controlled manufacturing system, comprising the steps of:
   (A) storing a set of fault codes, each of the codes representing a possible fault in a component forming part of the manufacturing system;
   (B) displaying a fault code corresponding to a component responsible for producing a possible fault;
   (C) generating, in response to the fault code displayed in step (B), a visual image showing the component responsible for the possible fault and the location of the component within the manufacturing system, generating an operator interactive link adapted to access programming logic associated with the component;
   (C1) storing a software editing program adapted to edit said programming logic for operating the manufacturing system; and,
   (C2) retrieving at least portions of the software editing program and said programming logic related to the component.

2. The method of claim 1, further comprising the steps of:
   (D) storing a set of visual images respectively showing the components of the manufacturing system, and the locations of the components within the manufacturing system; and,
   (E) associating the visual images stored in step (D) with the fault codes stored in step (A).

3. The method of claim 2, wherein step (D) is performed by displaying an interactive three dimensional drawing of the machine system in which the component responsible for the possible fault is highlighted.

4. The method of claim 1, further comprising the step of automatically generating, in response to the fault code displayed in step (B), a visual display of a set of characteristics of the component responsible for the possible fault.

5. The method of claim 1, including the step of storing digital files each representing a digitized photographic image of one of the components.

6. The method of claim 1, including the step of storing digital files each representing a digitized CAD drawing of one of the components.

7. The method of claim 1, wherein step (C) includes retrieving a digitized image of the component from a storage medium.

8. A method for identifying sources of faults in the operation of a machine system controlled by a programmable logic controller (PLC), comprising the steps of:
   (A) storing visual representations of a plurality of devices within the machine system, wherein each of the devices is capable of producing a fault;
   (B) storing a plurality of fault messages each describing a possible fault produced by at least one of the devices;
   (C) associating the visual representations stored in step (A) with the fault messages stored in step (B), such that each of the fault messages is associated with a visual representation of at least one of the devices;
   (D) displaying at least one of the fault messages when a fault is produced by a device; and,
   (E) displaying a visual representation of the device producing the fault displayed in step (D), and generating an operator interactive link adapted to access programming logic associated with the device producing the fault message.

9. The method of claim 8, wherein step (A) includes generating a CAD drawing of each of the devices and the location of the device within the machine system.

10. The method of claim 8, wherein: step (A) includes generating a CAD drawing of each of the devices showing the component parts of the device, and step (E) includes highlighting at least one component part of a device responsible for producing a fault.

11. The method of claim 8, wherein step (E) includes displaying a three dimensional interactive drawing showing the device producing the fault message and the location of the device within the machine system.

12. The method of claim 8, further comprising the steps of:
    (F) storing a plurality of sets of data describing characteristics of each of the devices;
    (G) associating the sets of data stored in step (F) with the fault messages stored in step (B), such that each of the fault messages is associated with a set of data describing characteristics of at least one of the devices; and,
    (H) retrieving and displaying the set of data associated with the device producing the fault message displayed in step (D).

13. The method of claim 8, further comprising the steps of:
    (F) storing a software editing program adapted to edit said programming logic; and,
    (G) retrieving at least portions of the software editing program and said programming logic related to the device producing the fault message displayed in step (D).

14. The method of claim 13, wherein:
    step (F) includes assigning an address to each of the devices, and associating portions of the program logic with each of the addresses, and
    step (G) includes launching the software editing program along with the program logic associated with the device producing the fault message displayed in step (D).

15. A system for locating and visualizing faults in the operation of a computer controlled manufacturing operation having multiple operating stations, comprising:
    a display for displaying information related to the operation of the manufacturing operation, including display of fault information;
    a memory system;
    a set of fault codes and related fault messages stored in the memory system;
    a set of images stored in the memory system, the stored images visually representing the operating stations and components within the stations; and,
    a programmed controller for sensing a fault in the manufacturing operation, for causing a fault code and fault message stored in the memory system to be displayed on the display, for causing one of the images stored in the memory system to be displayed that visually shows the particular operating station and component within the station responsible for producing the fault, and for causing display of an operator interactive link adapted to access programming logic associated with said component.

16. The system of claim 15, wherein the programmed controller causes the component responsible for producing the fault to be highlighted in the displayed image of the station.

17. The system of claim 15, further comprising a set of data associated with each of the components stored in the memory system, each set of data including characteristics of one of the components, and wherein the programmed controller causes the data set to be displayed on the display corresponding to the component responsible for producing the fault.

18. The system of claim 15, further comprising program editing software and control logic stored in the memory system, and wherein the programmed controller automatically retrieves, in response to a sensed fault, the program editing software and control logic from the memory system for use by an operator in diagnosing and correcting the fault.

19. The system of claim 15, wherein each of the stored images is a digital file representing a three dimensional CAD drawing.

* * * * *